(12) United States Patent
Hayashi et al.

(10) Patent No.: US 8,141,670 B2
(45) Date of Patent: Mar. 27, 2012

(54) RADIATOR ATTACHMENT STRUCTURE FOR SADDLE-RIDE TYPE VEHICLE

(75) Inventors: Kosei Hayashi, Saitama (JP); Kazuro Furukawa, Saitama (JP); Hiroaki Takashiba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 12/651,861

(22) Filed: Jan. 4, 2010

(65) Prior Publication Data

US 2010/0187033 A1    Jul. 29, 2010

(30) Foreign Application Priority Data

Jan. 29, 2009  (JP) ................................. 2009-018705

(51) Int. Cl.
*B60K 11/04* (2006.01)
(52) U.S. Cl. ..................................... 180/68.6; 180/68.4
(58) Field of Classification Search ................. 180/68.4, 180/68.6, 229
See application file for complete search history.

(56) References Cited

U.S. PATENT DOCUMENTS

| 2,071,761 | A | * | 2/1937 | Nicholson | 180/226 |
| 4,011,921 | A | * | 3/1977 | Sakamoto et al. | 180/229 |
| 4,019,595 | A | * | 4/1977 | Imai et al. | 180/229 |
| 4,403,648 | A | * | 9/1983 | Styok | 165/76 |
| 5,984,035 | A | * | 11/1999 | Katoh et al. | 180/68.1 |
| 7,150,334 | B2 | * | 12/2006 | Kodan et al. | 180/68.4 |
| 7,422,081 | B2 | * | 9/2008 | Dufresne et al. | 180/68.1 |
| 7,762,367 | B2 | * | 7/2010 | Yamaguchi et al. | 180/68.1 |
| 2006/0065454 | A1 | * | 3/2006 | Oshima et al. | 180/68.4 |
| 2006/0102400 | A1 | * | 5/2006 | Okuno | 180/68.4 |
| 2008/0185121 | A1 | * | 8/2008 | Clarke | 165/44 |
| 2008/0202836 | A1 | * | 8/2008 | Atsuchi et al. | 180/229 |
| 2008/0223643 | A1 | * | 9/2008 | Arimura | 180/229 |
| 2009/0139473 | A1 | * | 6/2009 | McMillan | 123/41.49 |

FOREIGN PATENT DOCUMENTS

GB    2184700 A  *  7/1987
JP    2834998 B2    12/1998

* cited by examiner

*Primary Examiner* — John R Olszewski
(74) *Attorney, Agent, or Firm* — Birch, Stewart, Kolasch & Birch, LLP

(57) ABSTRACT

A radiator attachment structure for a motorcycle in which a down tube is formed in a shape having a curved portion, and a radiator can be disposed in a less visible manner while being erected. An upper portion of each of down tubes is formed as a curved portion curved in a side view. A lower portion of each of the down tube is formed as a linear slope portion extending linearly downwardly from a corresponding one of the curved portions in the side view. A radiator is disposed while being overlapped with the linear slope portions of the down tubes in the side view.

20 Claims, 11 Drawing Sheets

RADIATOR ATTACHMENT STRUCTURE FOR SADDLE-RIDE TYPE VEHICLE

CROSS-REFERENCE TO RELATED APPLICATIONS

The present application claims priority under 35 USC 119 to Japanese Patent Application No. 2009-018705 filed on Jan. 29, 2009 the entire contents of which are hereby incorporated by reference.

BACKGROUND OF THE INVENTION

1. Field of the Invention

The present invention relates to a radiator attachment structure for a saddle-ride type vehicle.

2. Description of Background Art

A motorcycle is known that includes a vehicle body frame having a pair of down tubes extending from a head pipe respectively on the left and right sides; and a radiator disposed between the pair of left and right down tubes. See, for example Japanese Patent No. 2834998.

In this motorcycle, the radiator is formed with a thickness substantially equal to the outer diameter of each of the down tubes, and side plates are fixedly disposed respectively at the left and right sides of an upper portion of this radiator. The radiator is then supported between both down tubes with the side plates therebetween. A support pin is attached and fixed to the lower end of the radiator. The support pin is supported by a cross pipe with a shock absorbing rubber member therebetween with the cross pipe being between the both down tubes. With this support structure, the radiator is disposed in a positional relationship in which the front surface of the radiator is substantially flush with the front edges of the down tubes. Further, a net screen is attached to the front surface side of the radiator, and this screen protects the radiator.

However, in the conventional structure, the pair of left and right down tubes and the screen are respectively formed in linear shapes in a side view, and the screen is disposed in a way to overlap with the linear shaped down tubes while being flush with the front surfaces thereof. Thus, the shapes of the down tubes are limited. In addition, when the radiator is disposed to be inclined forward and the forward inclination angle of the radiator thus is large, that is, when the radiator is laid, it is difficult to efficiently intake a flow of air. Thus, in order to improve the cooling performance, measures to make the radiator larger or the like need to be taken.

Even if the down tubes are curved in the side view without considering the aforementioned limitation, the radiator or the like existing between the curved portions is exposed and is highly visible in the side view because the upper end and lower end of the radiator are fixed to the down tubes.

On the other hand, in a case where the radiator is formed in a curved shape along the curved portions of the down tubes in order to avoid exposure of the radiator from the curved portions of the down tubes, the radiator needs to be designed exclusively, and it is difficult to use a versatile radiator. For this reason, a general radiator, which is formed in a linear shape in the side view, that is, one whose entire shape is in a rectangular solid is preferred.

SUMMARY AND OBJECTS OF THE INVENTION

The present invention has been made in view of the aforementioned problem. It is an object of an embodiment of the present invention is to provide a radiator attachment structure for a saddle-ride type vehicle in which each of down tubes is formed in a shape having a curved portion, and a radiator can be erected and disposed in a less visible manner.

For the purpose of solving the above-mentioned problems, according to an embodiment of the present invention, a radiator attachment structure for a saddle-ride type vehicle includes a vehicle body frame having a pair of down tubes extending from a head pipe respectively on left and right sides with a radiator between lower portions of the pair of left and right down tubes. An upper portion of each of the down tubes is formed as a curved portion curved in a side view. A lower portion of each of the down tubes is formed as a linear portion extending linearly downwardly from a corresponding one of the curved portions in the side view. The radiator is overlapped with or is positioned along the linear portions of the down tubes in the side view.

According to an embodiment of the present invention, the upper portion of each of the down tubes is formed as a curved portion curved in the side view, and the lower portion of each of the down tubes is formed as a linear portion extending linearly downwardly from the curved portion in the side view. The radiator then overlaps with the linear portions of the respective down tubes in the side view. Thus, each of the down tubes can be formed in a shape having the curved portion, and the radiator can be erected and disposed in a less visible manner. Since the radiator is erected, the cooling performance can be secured without making the radiator larger. In addition, since the radiator is not highly visible, the external appearance of the vehicle improves.

In the aforementioned configuration, a radiator grill may be provided in front of the radiator, and the radiator grill may be disposed in a way that the front surface of the radiator grill is positioned along the front surfaces of the curved portions and the linear portions of the respective down tubes. According to this configuration, the radiator grill can be disposed along the down tubes in a less visible manner, each of the down tubes having the curved portion. In addition, this radiator grill can protect the radiator while making the radiator less visible.

In addition, in the aforementioned configuration, the upper rear portion of the radiator may protrude from the rear surfaces of the down tubes in the side view, and the radiator may be attached to the linear portions of the down tubes at a portion lower than the protruding portion. According to this configuration, the radiator can be attached to the down tubes at a portion where the radiator overlaps with the down tubes, so that this attachment portion can be less visible.

According to the present invention, the upper portions of the down tubes are formed as the curved portions are each curved in the side view. The lower portions of the respective down tubes are formed as the linear portions each extend linearly downwardly from a corresponding one of the curved portions in the side view. The radiator then overlaps with the linear portions of the down tubes in the side view, so that while each of the down tubes is formed in a shape having the curved portion, the radiator can be erected and disposed in a less visible manner. In addition, since each of the down tubes can be formed in a shape having the curved portion, the radiator surface can be directed to the front of the vehicle body to a large extent as compared with a case where the radiator is disposed between the down tubes each having only a linear portion. Thereby, a flow of air that further improves the cooling performance can be obtained, and the radiator can be made smaller.

In addition, the radiator grill is provided in front of the radiator and is disposed in a way that the front surface of the radiator grill is positioned along the front surfaces of the curved portions and linear portions of the down tubes. Thus, the radiator grill can be disposed in a less visible manner, and the radiator grill can protect the radiator while making the radiator less visible in the meantime.

Moreover, the upper rear portion of the radiator protrudes from the rear surfaces of the respective down tubes in the side view, and the radiator is attached to the linear portions of the down tubes at a portion lower than the protruding portion. Thus, the attachment portions between the radiator and the down tubes can be made less visible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
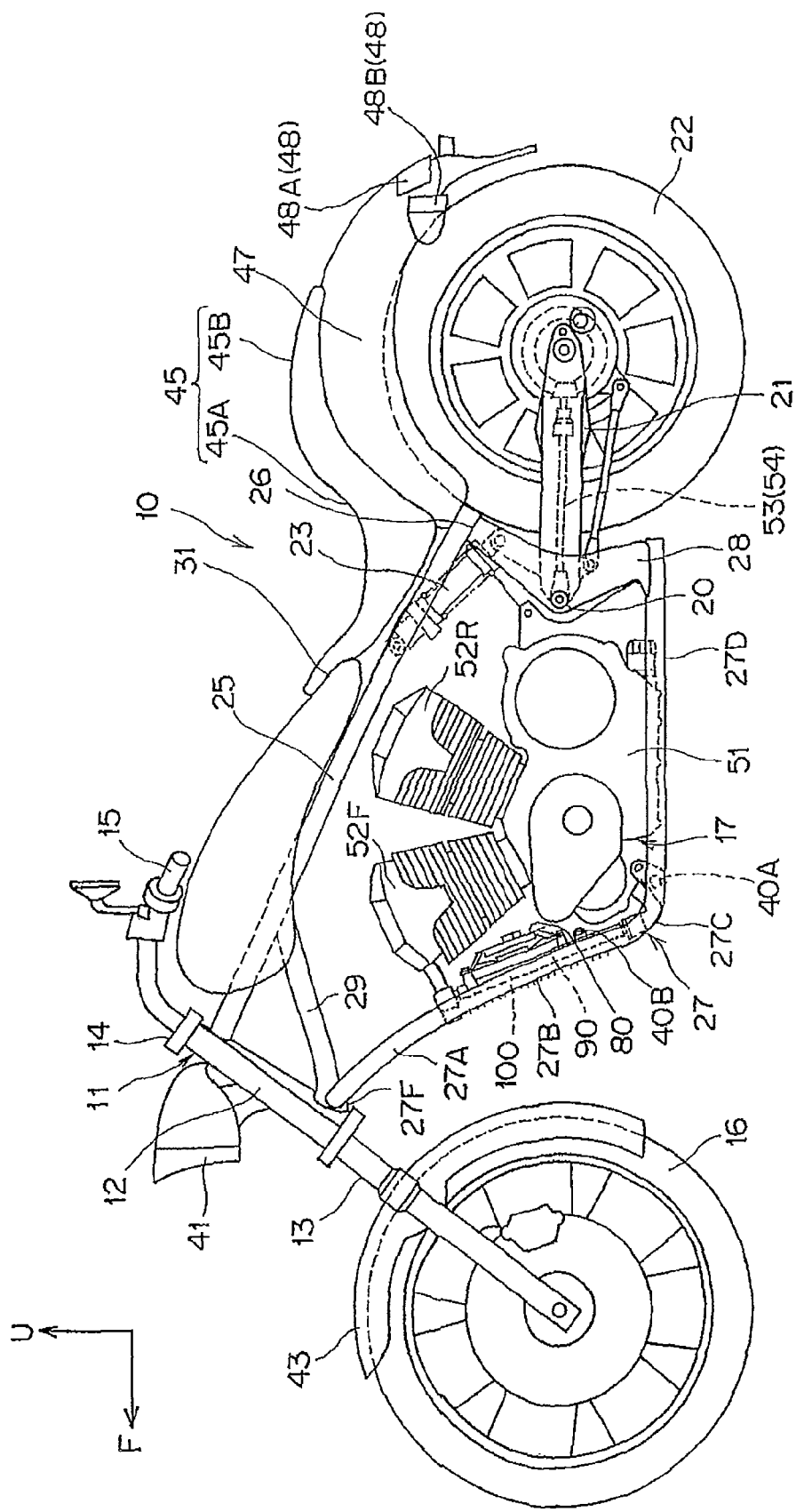
FIG. 1 is a side view of a motorcycle according to an embodiment of the present invention.

Hereinafter, an embodiment of the present invention will be described with reference to the accompanying drawings. Note that, throughout the description below, the terms "front," "rear," "left" and "right," and "up" and "down" are used to refer to directions as viewed from a rider on the vehicle body. In the drawings, arrows F, L and U denote the forward, left and upper directions of the vehicle body, respectively.

FIG. 1 is a side view of a motorcycle according to an embodiment of a saddle-ride type vehicle of the present invention.

A motorcycle 10 is a cruiser type motorcycle and includes a vehicle body frame 11; a pair of left and right front forks 13 rotatably supported by a head pipe 12 attached to the front end of the vehicle body frame 11; a steering handle 15 attached to a top bridge 14 supporting the upper ends of the front forks 13; a front wheel 16 rotatably supported by the front forks 13; an engine (power unit) 17 supported by the vehicle body frame 11; a rear swing arm 21 vertically swingably supported by a pivot 20 at a rear bottom portion of the vehicle body frame 11; a rear wheel (driving wheel) 22 rotatably supported by the rear end of this rear swing arm 21 and a rear shock absorber 23 inserted and interposed between the rear swing arm 21 and the vehicle body frame 11. Note that, illustrations of an air cleaner or a fuel supply device forming the engine air intake system, and an exhaust pipe, an exhaust muffler or the like forming the engine exhaust system are omitted in FIG. 1.

The vehicle frame 11 includes a pair of left and right main tubes (also, referred to as main frames) 25 made of steel pipes each extending in a rear downwardly direction from the head pipe 12; a pair of left and right rear tubes (also, referred to as rear tubes) 26 made of steel pipes provided so as to extend rearwardly from the rear ends of the respective main tubes 25; a pair of left and right down tubes (also, referred to as down frames) 27 made of steel pipes each of which extends downwardly from the head pipe 12, and thereafter, curves and then, extends rearwardly in a substantially horizontal line and a pair of left and right pivot plates 28 connecting the rear ends of the pair of left and right down tubes 27 and the rear ends of the rear tubes 26, respectively.

In this vehicle, the pair of left and right main tubes 25 are symmetrically formed with respect to a surface that extends in the front-rear direction of the vehicle body while passing through the center of the vehicle width direction (hereinafter, referred to as the center surface of the vehicle body). Then, each of the pair of left and right main tubes 25 is formed as a linear frame extending substantially linearly in the rear downwardly direction from the head pipe 12. A fuel tank 31 is attached to the main tubes 25 in a way to stride over the main tubes 25 from above.

This fuel tank 31 is disposed closer to the head pipe 12 and is formed in a tank shape extending in the front-rear direction substantially along the main tubes 25.

In addition, the pair of the left and right down tubes 27 are symmetrically formed with respect to the center of the vehicle width direction. The upper portion of each of the down tubes 27 is formed as a curved frame, which is curved.

To be more specific, each of the pair of left and right down tubes 27 integrally includes a curved portion 27A curved in a rear downwardly direction from the head pipe 12; a linear slope portion (linear portion) 27B extending linearly downwardly in a rear direction from the bottom end of this curved portion 27A; a bent portion 27C bent rearwardly from the bottom end of this linear slope portion 27B; and a horizontal portion 27D extending linearly rearwardly in a substantially horizontal line from the rear end of this bent portion 27C. In other words, the upper portion of each of the down tubes 27 is formed as the curved portion 27A curved in the side view, and the lower portion of each of the down tubes 27 is formed as the linear slope portion 27B extending linearly from a corresponding one of the curved portions 27A in the side view. In addition, a cross frame 40A is disposed between the rear ends of the bent portions 27C, that is, between the lower portions of the respective down tubes 27.

Moreover, the front ends of the pair of left and right down tubes 27 are bonded to each other and thereby joined together. The front ends of the down tubes 27 are connected to the head pipe 12 via this joined portion 27F. A reinforcement gusset pipe 29 extends rearwardly from this joined portion 27F and is then connected to the main tubes 25. In this manner, frame rigidity of the front portion of the vehicle body frame 11 is sufficiently secured.

Moreover, a headlight 41 is provided at the front portion of the head pipe 12. A front fender 43 covering the rear of the front wheel 16 from above is attached to the pair of left and right front forks 13.

In addition, a seat 45 on which a rider is seated is supported behind the fuel tank 31. This seat 45 integrally includes a front seat 45A, which extends rearwardly along the slope of the upper surface of the fuel tank 31 and on which the rider is seated; and a rear seat 45B, which extends rearwardly from this front seat 45A and is positioned above the rear wheel 22 and on which a fellow passenger is seated. This seat 45 is supported by the rear portions of the main tubes 25 and the rear tubes 26. A rear fender 47 covering the rear wheel 22 from above is supported at the lower rear portion of this seat 45. Lamps 48 including a tail light 48A, a turn signal 48B and the like are supported at the rear portion of the rear fender 47.

The engine 17 is supported within a space surrounded by the main tubes 25, the down tubes 27 and the pivot plates 28. This engine 17 is a front-rear V type two-cylinder water-cooled four-cycle engine provided with a crankcase 51; and two cylinder units 52F and 52R which are erected on this crankcase 51 at a predetermined bank angle in the front-rear direction of the vehicle body. Moreover, the power of this engine 17 is transmitted to the rear wheel 22 via a drive shaft 53 disposed in the rear swing arm 21 and passes through an area on a side (left side in this example) of the rear wheel 22. In other words, the power of the engine 17 is transmitted to the rear wheel via a shaft drive mechanism 54.

Moreover, the front portion of the engine 17 is not located between the pair of left and right down tubes 27 and is disposed behind the down tubes 27 with a little space between the pair of left and right down tubes 27 and the front portion of the engine 17. Thereby, the entire engine 17 is formed to be visible in the side view. Moreover, the space, which is narrow in the front-rear direction, is formed between the crankcase 51 and the down tubes 27, and a cross frame 40B connecting between the down tubes 27 is disposed in this space.

A radiator 70 through which a coolant for cooling the engine 17 circulates, and a radiator grill 100 at least covering the front surface of this radiator 70 are disposed between the pair of left and right down tubes 27 in front of the engine 17.

Figure 2:
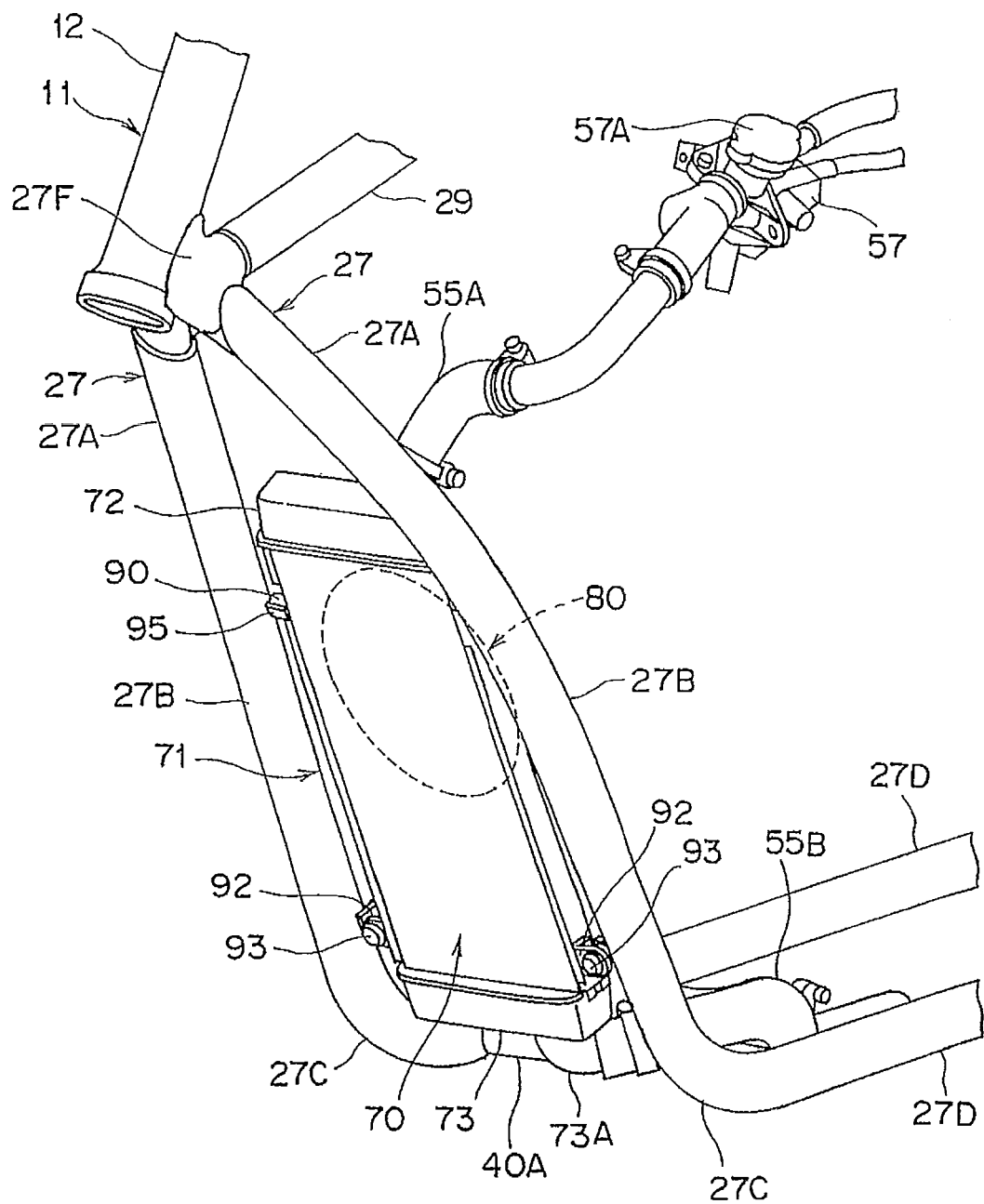
FIG. 2 is a perspective view showing a radiator together with a vehicle body frame.
Figure 3:
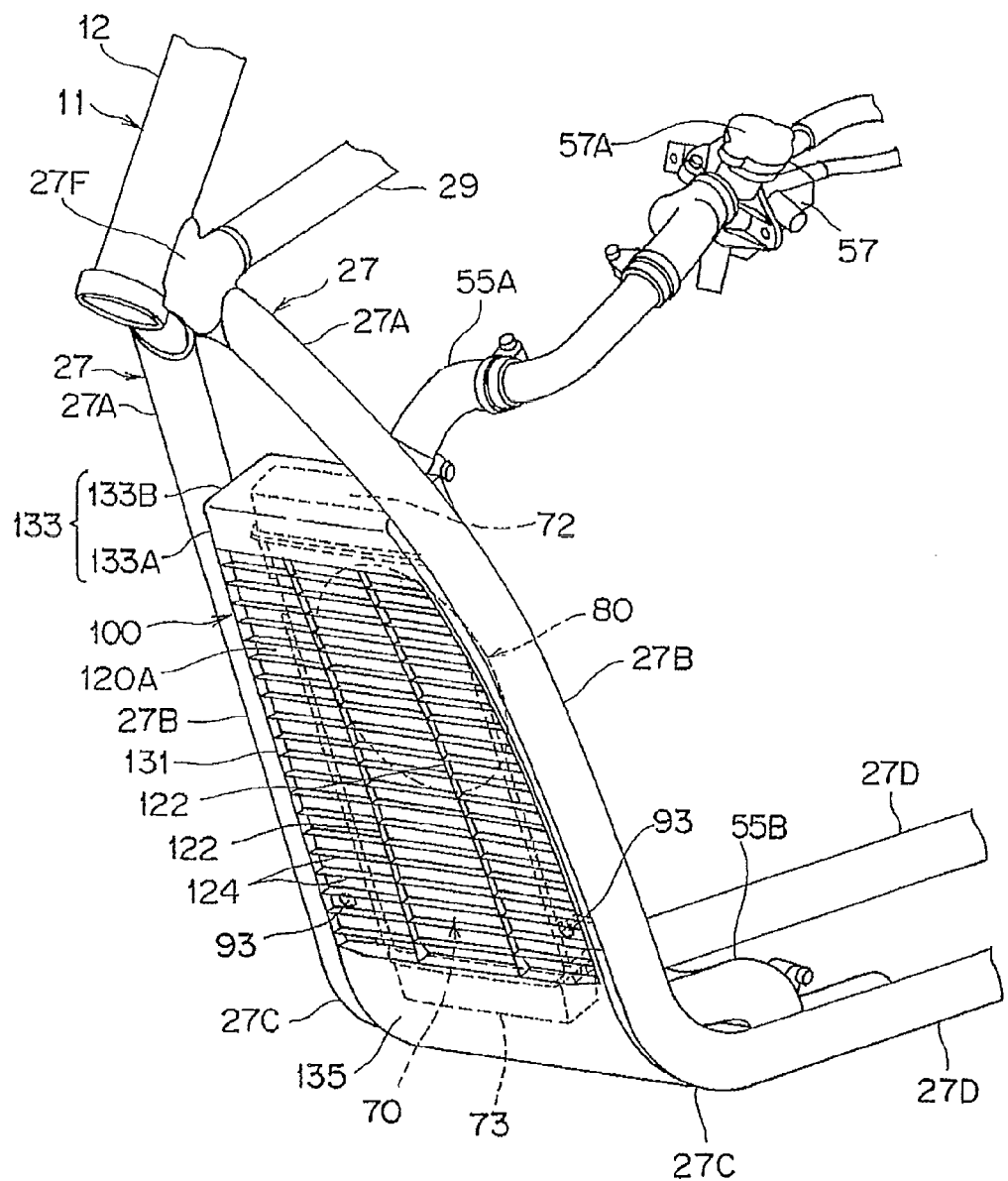
FIG. 3 is a perspective view showing a radiator grill together with the vehicle body frame.
Figures 4A, 4B:
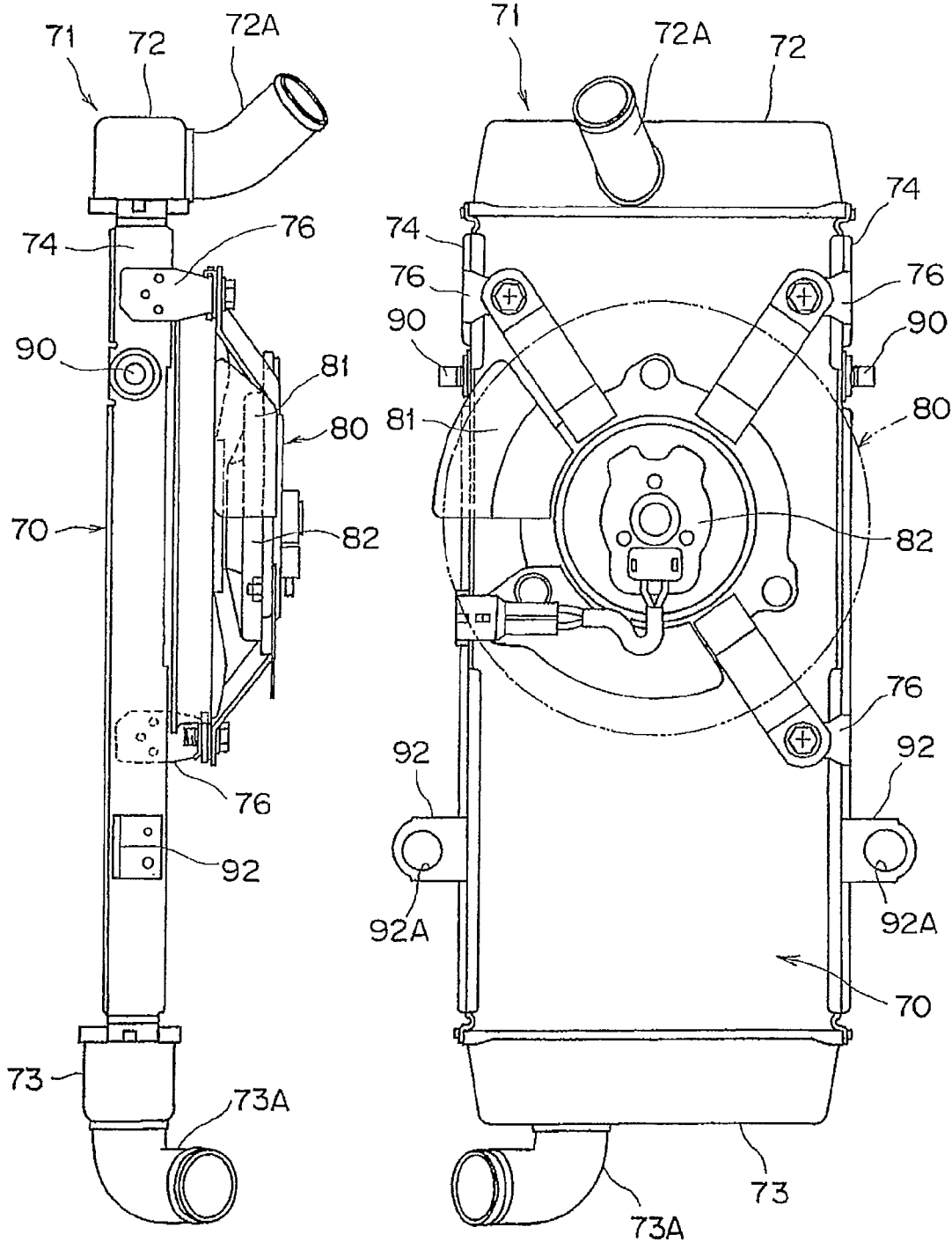
FIG. 4(A) is a view of a radiator assembly as viewed laterally.
FIG. 4(B) is a view of the radiator assembly as viewed from the rear direction of the vehicle body.

FIG. 2 is a perspective view showing the radiator 70 along with the vehicle body frame 11. FIG. 3 is a perspective view showing a state in which the radiator grill 100 is attached to the structure in FIG. 2, along with the vehicle body frame 11. FIG. 4(A) shows a view of a state in which radiator attachment parts are mounted to the radiator 70 (hereinafter, referred to as a radiator assembly 71), as viewed laterally. FIG. 4(B) shows a view of the aforementioned state as viewed from behind the vehicle body.

The radiator 70 is formed in a vertically long rectangular solid and is configured as a fin-tube type radiator having a gap that allows a flow of air to flow therethrough. An upper tank 72 having a pipe 72A is attached to the upper portion of the radiator 70, and a lower tank 73 having a pipe 73A is attached to the lower portion of the radiator 70. A pair of left and right plate members 74 each being placed as a bridge between the upper tank 72 and the lower tank 73 are attached to the left and right side surfaces of the radiator 70, respectively, while being substantially in close contact therewith.

Each of the upper tank 72 and the lower tank 73 is formed in a trapezoidal case having a width substantially the same as the width of the radiator 70. Thereby, even in a state where both of these tanks 72 and 73 are attached to the radiator 70, the width of the radiator assembly 71 is not increased, and the width of the radiator assembly 71 can be kept approximately the same as the width of the radiator 70.

In addition, the pipe 72A of this upper tank 72 extends in the rear upward direction from the back surface of the upper tank 72 and functions as a downstream side pipe through which a coolant circulated through the radiator 70 is discharged. The pipe 73A of the lower tank 73 is formed as a bent pipe that extends from the bottom surface of the lower tank 73 while being bent rearwardly and is then bent in an obliquely rearwardly left direction toward a coolant pump attachment side (left side of the engine 17 in this example) of the engine 17. The pipe 73A functions as an upstream side pipe through which the coolant is caused to flow from the engine 17 to the radiator 70.

Note that these pipes 72A and 72B are connected to piping parts or the engine 17 via hoses 55A and 55B (refer to FIGS. 2 and 3), respectively, the hoses formed of a soft material such as rubber. In the drawings, a piping part 57 includes a radiator cap 57A that is provided at the downstream side of the pipe 72A.

Each of the pair of left and right plate members 74 is formed in a thin plate shape extending linearly so as to substantially cover a corresponding one of the left and right side surfaces of the radiator 70 from the upper end of the side surface to the bottom end thereof. Thus, even in a state where these plate members 74 are attached to the radiator 70, the width of the entire radiator assembly 71 hardly increases, and the width thereof can be suppressed to a width as large as that of the radiator 70.

A plurality of plate-shaped brackets for use in attachment of a radiator fan 80 to the upper half back surface side of the radiator 70 are provided to the pair of left and right plate members 74. The radiator fan 80 includes a shroud 81 formed in a cover shape that substantially fits within the width of the radiator 70; a motor unit 82 fixed by this shroud 81; and a cooling fan (not shown) disposed in the shroud 81 and rotationally driven by the motor unit 82. The shroud 81 is fixed to one of the plate members 74 via a corresponding one of the aforementioned brackets 76. In this manner, the shroud 81 is integrally fixed to the radiator 70.

Thereby, the upper tank 72, the lower tank 73, the plate members 74 and the radiator fan 80 are integrally attached to the radiator 70. These integrated components are configured to be attachable to or detachable from the vehicle body frame 11 as the radiator assembly 71.

Figure 5:
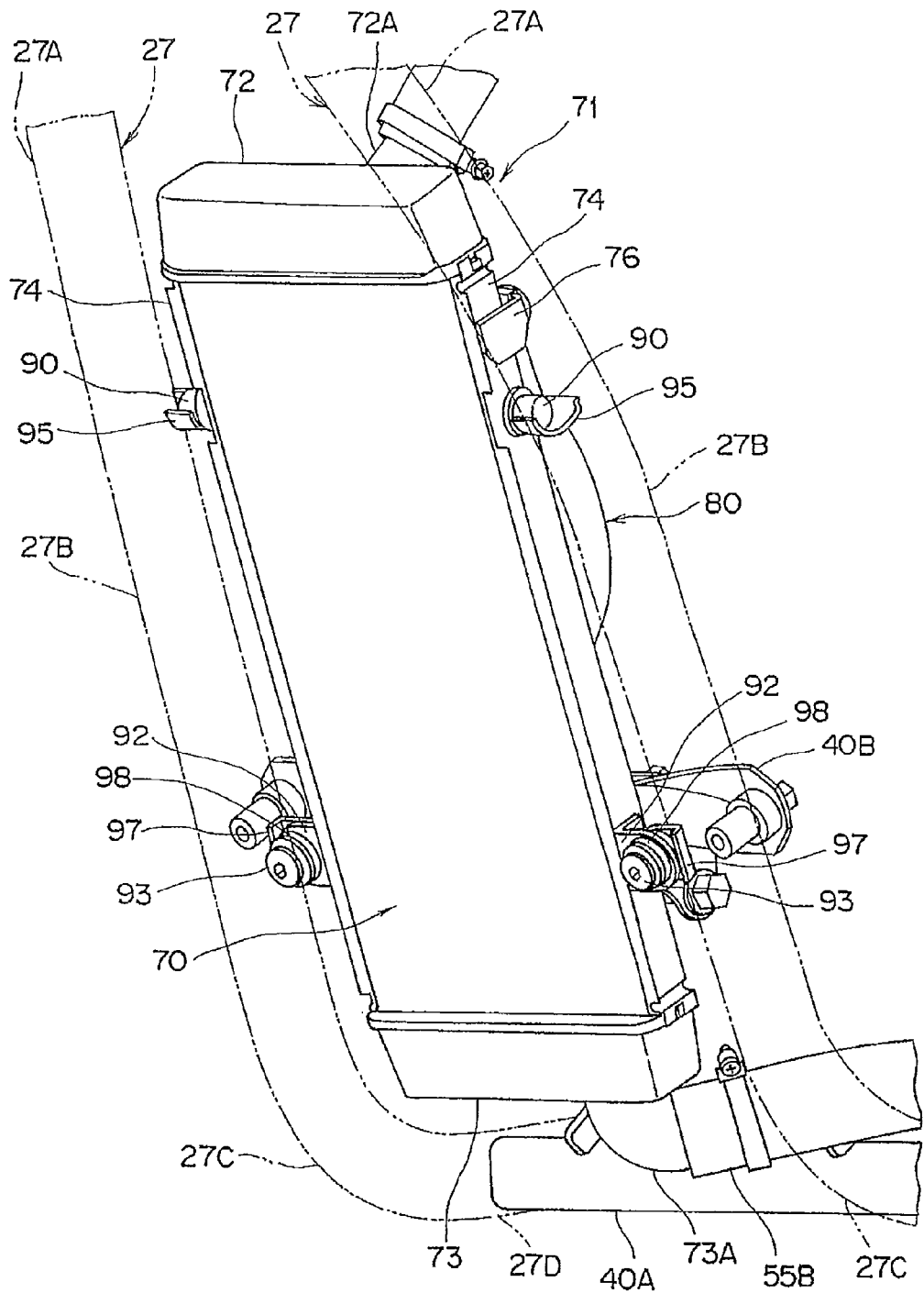
FIG. 5 is a perspective view of a state in which the radiator is attached to the vehicle body frame, as viewed from an obliquely forward left side.
Figure 6:
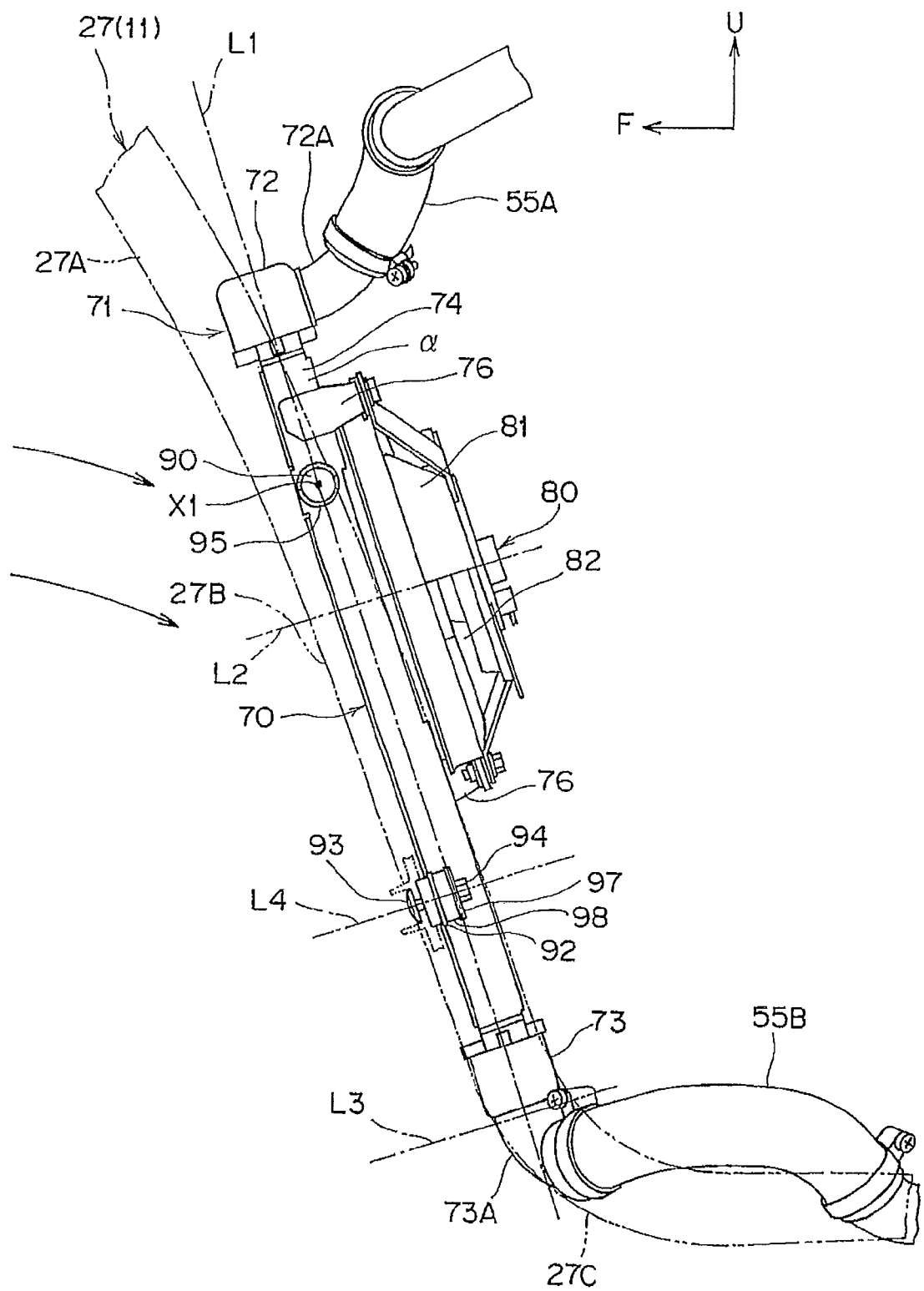
FIG. 6 is a view of the state in which the radiator is attached to the vehicle body frame, as viewed laterally.
Figure 7:
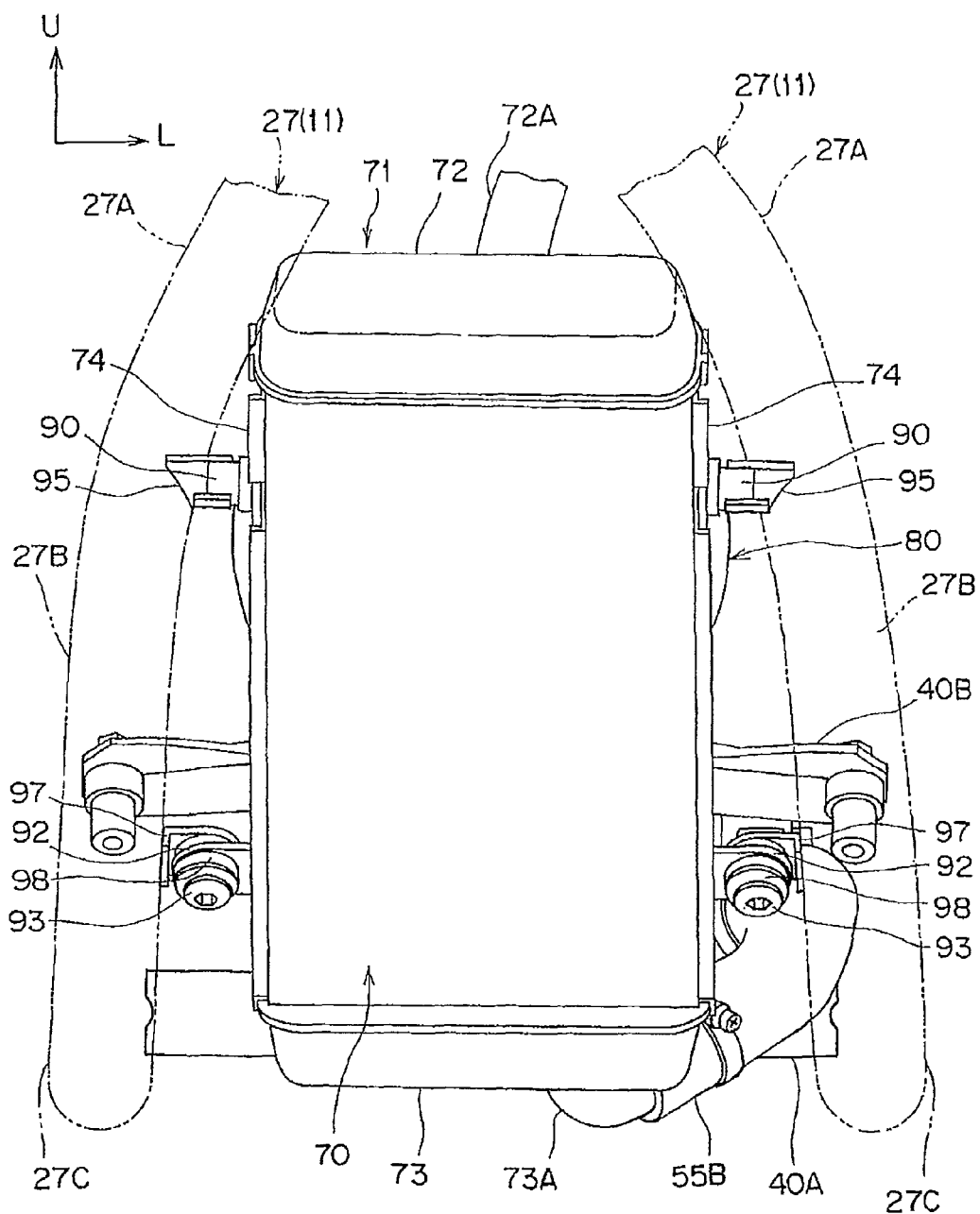
FIG. 7 is a view of the state in which the radiator is attached to the vehicle body frame, as viewed from an upper front side of the vehicle body.

FIG. 5 is a perspective view of a state in which the radiator 70 (radiator assembly 71) is attached to the vehicle body frame 11, as viewed from an obliquely forward left side. FIG. 6 is a view of the aforementioned state as viewed laterally (from a left side of the vehicle body). FIG. 7 is a view of the aforementioned state as viewed from an upper front side of the vehicle body.

In FIG. 6, a position L2 corresponds to the boundary between the curved portion 27A and the linear slope portion 27B of a corresponding one of the down tubes 27. In addition, in FIG. 6 a position L3 corresponds to the boundary between the linear slope portion 27B and the bent portion 27C of the down tube 27.

As shown in the drawings, the radiator 70, that is, the radiator assembly 71 has a width smaller than a space between the pair of left and right down tubes 27 positioned in front of the engine 17. The radiator assembly 71 is formed in a way that the width of the entire radiator assembly 71 fits within the space between the aforementioned down tubes 27 even when the aforementioned upper tank 72, the lower tank 73 and the plate members 74 are attached to the radiator 70.

Moreover, as shown in FIG. 6, the radiator 70 alone is formed with a thickness smaller than the pipe diameter of each of the down tubes 27 and with a vertical length longer than the linear slope portion 27B of the down tube 27 in the side view. In addition, each of the upper tank 72 and the lower tank 73 is formed with a thickness substantially the same as the pipe diameter (depth) of the down tube 27 in the side view.

More specifically, in this configuration, the radiator 70 is formed in a rectangular solid shape. Moreover, even when the radiator 70 is in the assembly state in which the upper tank 72 and the lower tank 73 are attached to this radiator 70, that is, when the radiator 70 is configured as the radiator assembly 71, the entire shape thereof is formed in a substantially solid rectangular shape.

In addition, each of the down tubes 27 of this configuration has the upper portion thereof formed of a curved frame having a curved portion 27A. Accordingly, in a case where the vertical length of the radiator 70 is formed relatively long as in the case of this configuration, there is a portion in each of the radiator 70, the upper tank 72 and the lower tank 73, which cannot be overlapped with the down tube 72 in the side view, the upper tank 72 and the lower tank 73 attached to the top and bottom portions of the radiator 70, respectively.

In this respect, in this configuration, as shown in FIG. 6, the radiator 70 is inclined in a way that a front-rear center line L1 extending in the longitudinal direction of the radiator 70 is positioned along with a direction in which the linear slope portion 27B of the down tube 27 extends. The radiator 70 is then disposed at this inclination angle so as to overlap with a back portion of the linear slope portions 27B, the back portion being a portion of the down tube 27 closer to the back surface thereof. Thereby, as shown in the drawing, the radiator 70 and the like are not exposed in the side view from the down tube 27 except for the curved portion 27A (linear slope portion 27B and bent portion 27C). The radiator 70 and the lower tank 73 can be almost completely overlapped with the down tube 27 in the side view.

In addition, in this configuration, the curved portion 27A is positioned above the substantially center portion of the radiator fan 80 and gradually curves forward as the curved portion 27A extends upward. Thus, as the radiator 70 is positioned higher than the substantially center portion of the radiator fan 80, the radiator 70 is exposed little by little from the down tube 27 in the side view, and at the upper tank 72, a front half of the radiator 70 overlaps with the down tube 27. More specifically, an upper rear half portion α of the radiator 70 slightly protrudes from the rear surface (back surface) of the down tube 27. However, this protruding portion protrudes from a portion where the curved portion 27A is inclined at an angle close to the inclination angle of the linear slope portion 27B, so that the protruding amount is small. Moreover, the radiator fan 80 exposed in the rear direction of the down tube 27 in the side view exists near this protruding portion, so that this protruding portion is not highly visible, and influence on the external appearance is small.

Further, in this configuration, the radiator 70 is disposed so as to align with the rear surface of the linear slope portion 27B of the down tube 27 in the side view. To be more specific, the radiator 70 is disposed so as to be substantially flush with the rear surface of the linear slope portion 27B. Thus, a space that overlaps with the down tube 27 in the side view can be widely secured in front of the radiator 70, and this space can be utilized as the space for the radiator grill 100.

Moreover, even in a case where the radiator 70 is disposed while being overlapped with the linear slope portion 27B of the down tube 27 and being aligned with the rear surface of the linear slope portion 27B, the front half portion of the upper tank 72 at the upper portion of the radiator 70 can be overlapped with the curved portion 27A of the down tube 27. Accordingly, the upper tank 72 can be also disposed in a less visible manner. With these advantages, the radiator assembly 71 can be disposed in a less visible manner while the space for the radiator grill 100 is secured between the down tubes 27.

Next, a description will be given of a support structure for this radiator 70 (radiator assembly 71) in the vehicle body frame 11.

To the upper left and right portions of the radiator 70, a pair of left and right bosses (refer to FIGS. 4(A) and 4(B)), which protrude in the left and right directions, respectively, are integrally provided. To the pair of left and right down tubes 27 of the vehicle body frame 11, a pair of left and right boss receivers 95 (refer to FIGS. 5 to 7) are provided, respectively. The pair of left and right boss receivers 95 protrude toward an inner side of the vehicle width direction from the down tubes 27 and receive the bosses 90, respectively.

To be more specific, as shown in FIGS. 4(A) and 4(B), the pair of left and right bosses 90 are formed in cylindrical shapes that protrude in the left and right directions, respectively, along the same axis extending in the horizontal direction of the radiator 70 at the upper portion of the radiator 70. In addition, the pair of left and right bosses 90 penetrate through the pair of left and right plate members 74 and then protrude in the left and right directions, respectively.

As shown in FIGS. 5 to 7, the pair of left and right boss receivers 95 on the down tubes 27 side are integrally bonded to the inner surfaces of the down tubes 27 by welding or the like at the curved portions 27A of the pair of left and right down tubes 27, respectively. Each of the left and right pair of the boss receivers 95 is a curved plate member extending to the inner side of the vehicle width direction and formed in a cross sectional shape forming a circular groove whose upper portion is opened along the circular arc of the outer circumferential surface of a corresponding one of the pair of left and right bosses 90.

More specifically, a curved surface of each of the bosses 90 and a curved surface of each of the boss receivers 95 coincide with each other. Thereby, the pair of left and right bosses 90 and the pair of left and right boss receivers 95 can rotatably support the radiator 70 (radiator assembly 71) at the axes of the bosses 90 as the supporting points when the bosses 90 are placed on the pair of the boss receivers 95, respectively.

Figure 8:
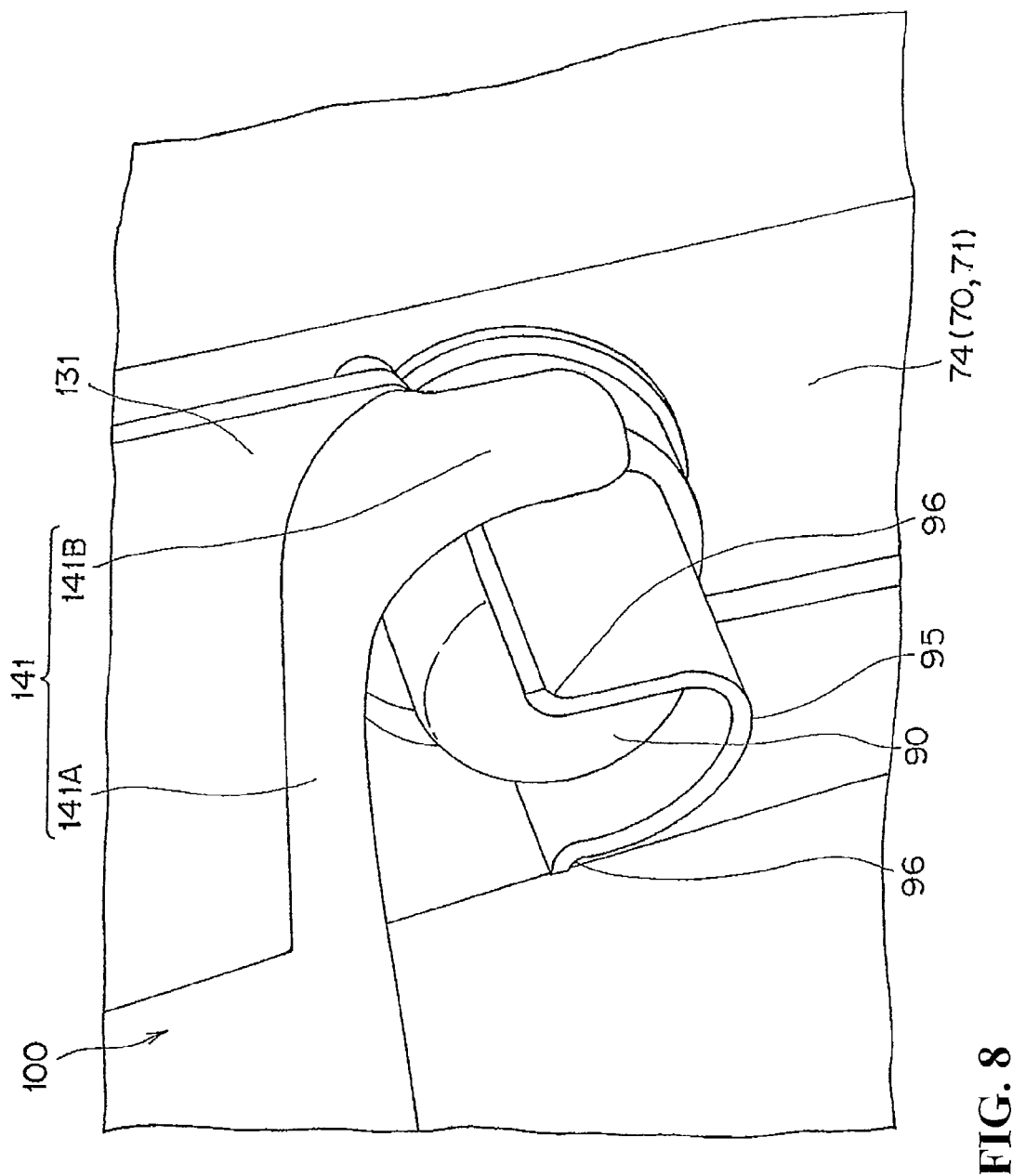
FIG. 8 is a view showing a boss receiver together with a surrounding structure thereof.

FIG. 8 shows one of the boss receivers 95 with a surrounding structure thereof. As shown in FIG. 8, a pair of front and rear curved portions 96 are integrally formed at a pair of front and rear upper ends of the boss receiver 95, respectively. The pair of front and rear curved portions 96 are curved toward the front and rear directions, respectively, so as to widen the upper opening portion of the boss receiver 95 in the front and rear directions. These curved portions 96 are configured to guide the bosses 90 of the radiator 70 to the inner sides of the boss receivers 95, respectively.

Further, as shown in FIG. 6, each of the bosses 90 and a corresponding one of the boss receivers 95 are arranged at the position where the radiator 70 and the down tubes 27 overlap with each other in the side view. More specifically, the bosses 90 and the boss receivers 95 are provided so that an uppermost position X1 can be the axis of the bosses 90 within a range to satisfy the condition.

Thereby, when the bosses 90 of the radiator 70 (radiator assembly 71) are inserted into the boss receivers 95 of the respective down tubes 27, the insertion position can be set at a high position. Thus, the visibility of the insertion position improves. Thereby, this operation, that is, the attachment work of the radiator 70 can be made easier.

In this configuration, the boss receivers 95 of the respective down tubes 27 rotatably support the bosses 90 of the radiator 70. Thus, at the time of the aforementioned attachment work, the radiator 70 (radiator assembly 71) does not have to be attached in the posture in which the radiator 70 is positioned along the down tubes 27 (attachment posture) as shown in FIG. 5. Note that, in this support state, the radiator 70 (radiator assembly 71) is in the state of being rotatably supported, but not in the final attachment state. Thus, this support state is referred to as a temporary attachment state.

In this temporary attachment state, the radiator 70 (radiator assembly 71) is rotatably supported at the common axis of the pair of left and right bosses 90 each extending in the vehicle width direction, so that, by rotating the radiator 70, the radiator 70 can be easily adjusted to be in the posture in which the radiator 70 overlaps with the down tubes 27. For this reason, at the stage of the temporary attachment, the radiator 70 does not have to be attached in the posture in which the radiator 70 is positioned along the down tubes 27 (posture shown in FIG. 6). Thus, the attachment work of the radiator 70 can be made easier. Moreover, the operation to adjust the radiator 70 in the temporary attachment state to be in the posture in which the radiator 70 is positioned along the down tubes 27 is easily performed.

The following description is given of a fixing structure for fixing the radiator 70 (radiator assembly 71) at the position where the radiator 70 overlaps with the down tubes 27 from this temporary attachment state.

This fixing structure includes a pair of left and right brackets 92 (refer to FIGS. 4(A) and 4(B)) provided at the lower portion of the radiator 70 (radiator assembly 71); and a pair of left and right stays 97 (refer to FIGS. 5 to 7) which are provided on the vehicle body frame 11 side and at which the brackets 92 are fixed with bolts 93 and nuts 94, respectively.

To be more specific, as shown in FIGS. 4A and B, the pair of left and right brackets 92 extend in the left and right directions from the left and right portions of the lower portion of the radiator 70, respectively. Each of the pair of left and right brackets 92 are formed of a plate member having an opening portion 92A formed at the end thereof. More specifically, each of the brackets 92 is formed by bending a plate member in an L-shape and then integrating the plate member with the radiator 70 (radiator assembly 71) while fixing one end of the plate member at a corresponding one of the plate-shaped members 74 provided at the left and right portions of the radiator 70, respectively. Then, the other end of each of the plate members is caused to protrude in a corresponding one of the left and right directions of the radiator 70. An opening portion 92A, that opens in the front-rear direction (direction perpendicular to the front-rear center line L1) of the radiator 70, is formed on each of the other ends of the respective plate members.

The pair of left and right stays 97 provided on the vehicle frame 11 side are formed of plate members extending so as to protrude toward the inner side of the vehicle width direction from the inner side surfaces of the pair of left and right down tubes 27, respectively, as shown in FIGS. 5 and 7. Each of the stays 97 is provided with a bolt insertion hole 97A (refer to FIG. 9) that penetrates through the stay 97 upward in the rear direction of the vehicle body. More specifically, the pair of left and right stays 97 are provided at the respective lower portions of the linear slope portions 27B of the down tubes 27. The bolt through hole 97A provided at each of the stays 97 is formed as a hole penetrating through the stay 97 in a right angle direction in the side view with respect to the direction in which a corresponding one of the linear slope portions 27B of the down tubes 27 extends, the linear slope portion 27B being a stay attachment member. Thereby, as shown in FIG. 6, an axis line L4 of the bolt 93 inserted through this bolt insertion hole 97A is made perpendicular to a corresponding one of the linear slope portions 27B of the down tubes 27.

The radiator 70 (radiator assembly 71) is set at a position by rotating the radiator 70 with respect to the down tubes 27, the position being where the radiator 70 overlaps with the down tubes 27 in the side view. Thereafter, the bolts 93 and the nuts 94 are fastened so as to keep the radiator 70 at this position. In this manner, the radiator 70 (radiator assembly 71) can be fixed at this position.

Figure 9:
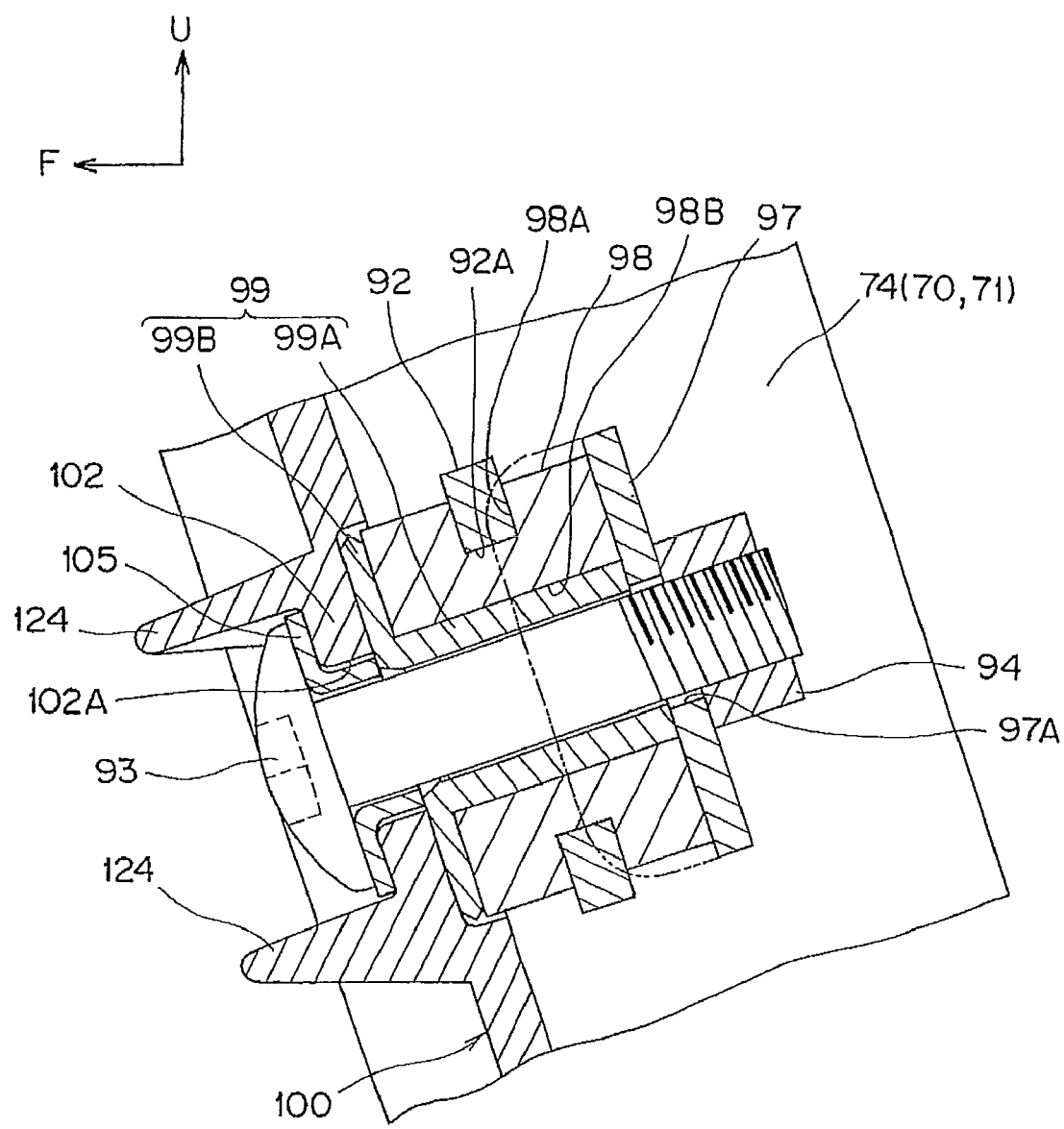
FIG. 9 is a view showing a bolt fixing structure of the radiator and down tube.

FIG. 9 shows a bolt fixing structure for the radiator 70 and the down tubes 27. Note that, this bolt fixing structure is also used as a bolt fixing structure for the radiator grill 100, so that the radiator grill 100 is shown as well in FIG. 9.

As shown in FIG. 9, to the opening portion 92A of each of the pair of left and right brackets 92 provided on the radiator 70 side, a tubular rubber member 98 protruding in the front-rear direction of the bracket 92 is attached. Thus, when the radiator 70 is caused to rotate toward the down tubes 27, the rubber members 98 are brought into contact with the respective stays 97 on the down tubes 27 side (refer to FIG. 9) and thus regulate further rotation of the radiator 70. The position where the rotation of the radiator 70 is regulated nearly corresponds to the position where the radiator 70 overlaps with the linear slope portions 27B of the down tubes 27 in the side view (position shown in FIG. 6). Thereby, the positioning of the attachment position of the radiator 70 can be easily performed.

This bolt fixing structure will be described in more detail. As shown in FIG. 9, a groove 98A extending annularly is formed at the outer periphery of each of the rubber members 98, and this groove 98A fits with a corresponding one of the opening portions 92A of the pair of left and right brackets 92. Thereby, the rubber members 98 are integrally attached to the pair of left and right brackets 92, respectively. Each of the rubber members 98 has an insertion hole 98B penetrating through in the front-rear direction, and a collar 99 is inserted through this insertion hole 98B.

The collar 99 integrally includes a tubular portion 99A forming the main body of the collar; and a brim portion 99B expanding in the radial direction from the front end of the tubular portion 99A. The tubular portion 99A is inserted into the insertion hole 98B of the rubber member 98, and the brim portion 99B is thus brought into contact with the front end surface of the rubber member 98.

The tip of the bolt 93 is caused to protrude behind the stay 97 via the bolt insertion hole 97A of the stay 97 on a corresponding one of the down tubes 27 side by inserting the bolt 93 through the collar 99 from the front of the collar 99. The nut 94 is fastened to this protruding portion (mail screw portion), and thereby, the radiator 70 and the down tube 27 can be fixed by the bolt in the state where the rubber member 98 is held between the radiator 70 and the down tube 27.

The radiator 70 can be a so called rubber mounted by disposing the rubber member 98 between the radiator 70 (radiator assembly 71) and the down tube 27 in the manner described above. Thereby, it is possible to suppress transmission of vibration of the vehicle body frame 11 side to the radiator 70 (radiator assembly 71).

Note that, since direct contact of the bolt 93 with the rubber member 98 is avoided because of the collar 99, damage on the rubber member 98 due to contact with the bolt can be avoided.

In this configuration, as shown in FIG. 7, the linear slope portions 27B of the pair of left and right down tubes 27 expand outward in the vehicle width direction, as the linear slope portions 27B extend downwardly, so that the space between the down tubes 27 is formed wider at the lower portion thereof. On the other hand, the width of the radiator 70 (radiator assembly 71) is substantially constant in the vertical direction, so that the space between the radiator 70 (radiator assembly 71) and each of the down tubes 27 is wider as the space extends downwardly. In this configuration, as shown in FIG. 7, the bolt fixing structure for fixing the radiator 70 (radiator assembly 71) and each of the down tubes 27 is provided in the wider space at the lower portion, so that the layout space of the components for the bolt fixing structure can be efficiently secured. Moreover, since there is a margin in the space, the operation to fasten the bolt 93 and the nut 94 can be easily performed.

Furthermore, in this configuration, as shown in FIG. 9, a part of the radiator grill 100 is inserted and interposed between each of the head portions of the bolts 93 and a corresponding one of the collars 99. Thereby, the radiator grill 100 can be also held by the fastening force of the bolts 93 in this configuration.

More specifically, a pair of left and right bolt fastening portions 102 each having a bolt insertion hole 102A are integrally formed on the radiator grill 100 at positions corresponding to the pair of left and right brackets 92 of the radiator 70, respectively. After each of the bolts 93 to be inserted through a corresponding one of the brackets 92 is inserted through a corresponding one of the bolt insertion holes 102A of the radiator grill 100 via a collar 105, the bolt 93 is then inserted through the bracket 92 and fixed by the nut 94.

Note that, the aforementioned collar 105 is a component to be inserted and interposed between the head portion of the bolt 93 and the radiator grill 100 and then used to avoid direct contact of the bolt 93 with the radiator grill 100.

More specifically, the radiator grill 100 is also fastened by the pair of left and right bolts 93, and thereby, the bolt fixing structure and the rubber mount structure for the radiator 70 (radiator assembly 71) and the down tubes 27 are also used as the bolt fixing structure and rubber mount structure for the radiator grill 100 and the down tubes 27. Accordingly, as compared with a case where these structures are separately provided for the radiator 70 and the radiator grill 100, the number of parts can be reduced.

Next, a description will be given of other configurations of the radiator grill 100.

Figures 10A, 10B:
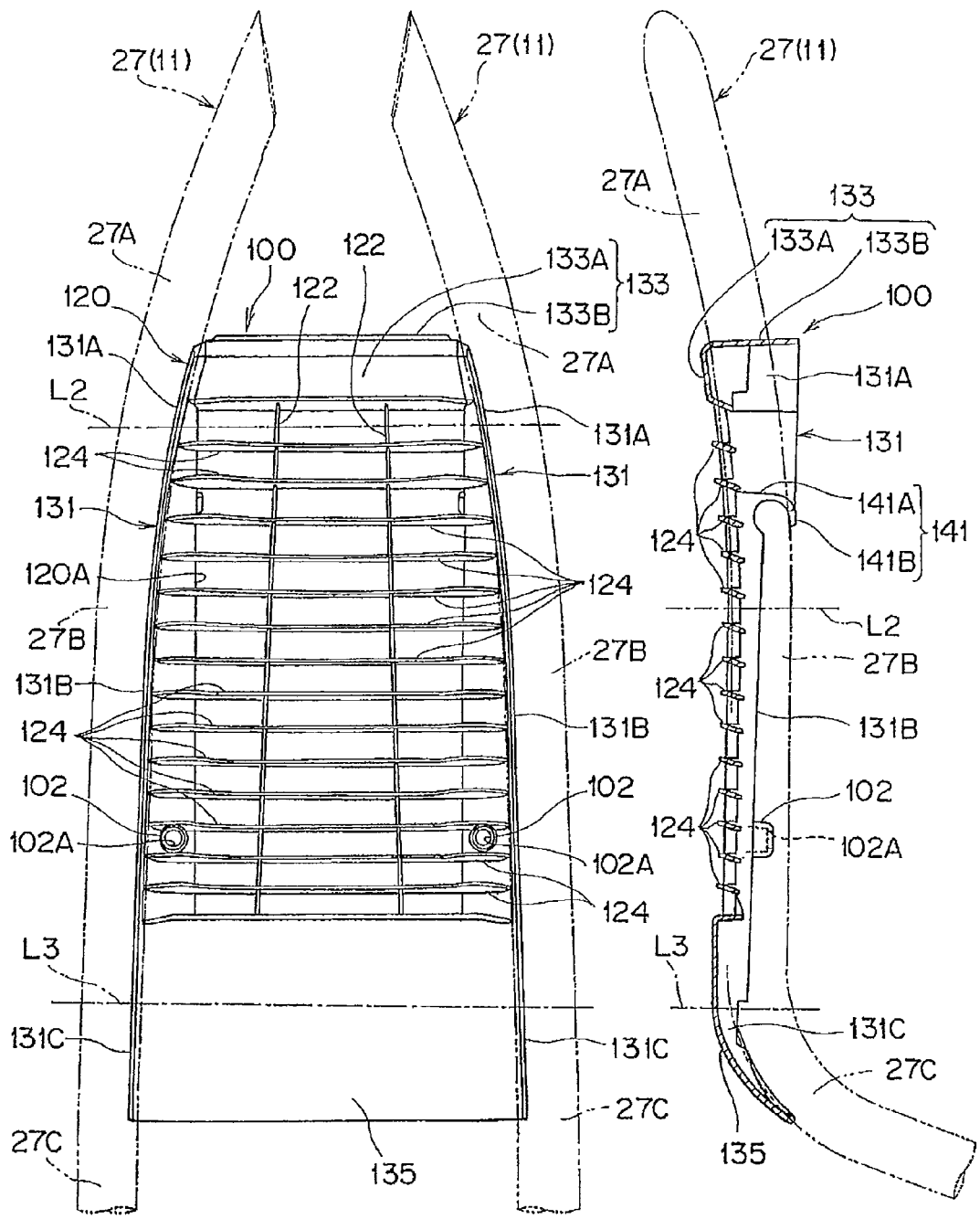
FIG. 10(A) is a front view of a radiator grill.
FIG. 10(B) is a side cross-sectional view of the radiator grill.

FIG. 10(A) is a front view of the radiator grill 100. FIG. 10(B) is a side cross-sectional view of the radiator grill 100. Note that, alternate long and short dashed line denotes the pair of left and right down tubes 27 in FIGS. 10(A) and 10(B).

The radiator grill 100 is a component that covers the front portion of the radiator 70 and fits in the space between the left and right down tubes 27 in a front view (refer to FIG. 10(A)). In addition, the radiator grill 100 is formed in a grill shape extending vertically along the front surfaces of the down tubes 27 in the side view (refer to FIG. 10(B)).

In this configuration, this radiator grill 100 extends from the curved portions 27A of the respective upper portions of the pair of left and right down tubes 27 to the bottom ends of the bent portions 27C through the linear slope portions 27B in the side view. In this manner, the radiator grill 100 is formed as a large radiator grill capable of covering, not only the front surface of the radiator 70, but the entire front surface of the radiator assembly 71 including the upper tank 72 and the lower tank 73.

To be more specific, this radiator grill 100 includes a grill frame 120 having a vertically long opening portion 120A at a position corresponding to the front surface of the radiator 70; and a plurality of vertical plates 122 and side plates 124, which are arranged in parallel and cross at this opening portion 102A. These components are integrally formed of a resin material.

The grill frame 120 is formed in a four-side frame that fits in the space between the pair of left and right down tubes 27 in a front view and that extends vertically along the front surfaces of the pair of left and right down tubes 27 in the side view. The grill frame 120 includes a pair of left and right vertical frames 131; an upper frame 133 extending in the vehicle width direction so as to connect between the upper portions of the pair of left and light vertical frames 131; and a lower frame 135 extending in the vehicle width direction so as to connect between the lower portions of the left and right pair of the vertical frames 131.

Each of the pair of left and right vertical frames 131 is formed of a plate-shaped frame member extending substantially vertically along a corresponding one of the curved portions 27A positioned at the respective upper portions of the pair of left and right down tubes 27; the linear slope portion 27B extending linearly downwardly from this curved portion 27A; and the bent portion 27C bent from the linear slope portion 27B.

More specifically, each of the vertical frames 131 extends outward in the vehicle width direction as the vertical frame 131 extends downwardly along the inner side surfaces of the curved portion 27A, the linear slope portion 27B and the bent portion 27C of a corresponding one of the down tubes 27 in a front view, as shown in FIG. 10(A). In addition, as shown in FIG. 10(B), the vertical frame 131 extends downwardly along the front side surfaces of the curved portion 27A, the linear slope portion 27B and the bent portion 27C of a corresponding one of the down tubes 27 in a side view. Further, the vertical frame 131 is formed in a shape that the width thereof substantially fits in each of the widths of the curved portion 27A, the linear slope portion 27B and the bent portion 27C of the down tube 27 in the side view.

As described above, each of the vertical frames 131 is integrally formed of a curved frame portion 131A curved along the curved portion 27A of a corresponding one of the down tubes 27; a linear frame portion 131B extending along the linear slope portion 27B of the down tube 27; and a bent frame portion 131C extending along the bent portion 27C of the down tube. Thus, the vertical frame 131 is configured in a way that the front surfaces of the vertical frames 131 can be overlapped with the down tubes 27 in the side view, respectively.

Moreover, both side portions of the opening portion 120A of the pair of left and right vertical frames 131 are formed to be surfaces each inclined for guiding a flow of air from the front of the vehicle body inward in the vehicle width direction as the surfaces extend rearwardly. Thereby, the grill frame 120 is configured in a way that the flow of air from the front of the vehicle body is efficiently guided by the inclined surfaces to the radiator 70 positioned behind the opening portion 120A.

In addition, the upper frame 133 includes a front surface plate 133A extending in the vehicle width direction so as to connect between the upper front edges of the pair of left and right vertical frames 131 (corresponding to the area between curved frame portions 131A); and an upper surface plate 133B which extends in the vehicle width direction so as to connect between the upper ends of the pair of left and right vertical frames 131 and whose front end is connected to the upper edge of the front surface plate 133A. The upper frame 133 is formed in a curved plate shape curved substantially along the front surfaces of the curved frame portions 131A of the vertical frames 131 in the side view.

Moreover, the lower frame 135 is formed in a bent plate shape which extends in the vehicle width direction so as to connect between the lower front edges of the pair of left and right vertical frames 131 (corresponding to the area between the lower portions of the linear slope portions 27B up to the area between the bent portions 27C), and which is then bent rearwardly as the lower frame 135 extends downwardly. Then, the lower frame 135 is formed in a curved plate shape curved substantially along the front surfaces of the lower portions of the linear slope portions 27B, and the front surfaces of the bent portions 27C of the down tubes 27 in the side view.

As shown in FIG. 10(B) and FIG. 8, a pair of left and right hooks 141 are integrally formed at the upper left and right portions of this radiator grill 100, respectively. The hooks 141 can be freely hooked on the pair of left and right bosses 90 on the radiator 70 side and the pair of left and right boss receivers 95 on the vehicle body frame 11 side, respectively. More specifically, each of the pair of left and right hooks 141 has: a base portion 141, which projects outward in the vehicle width direction at the upper portion of a corresponding one of the pair of left and right linear frame portions 131B, and which extends rearwardly; and a bent tip portion 141B, which is bent annularly from the rear end of the hook 141 and whose tip faces downwardly. Thereby, as shown in FIG. 8, the hooks 141 can be hooked from above on the pair of left and right bosses 90 of the radiator 70 and the pair of left and right boss receivers 95 of the vehicle body frame 11, respectively, in the state in which the bosses 90 are supported by the boss receivers 95, respectively.

In the state in which the pair of left and right hooks 141 are hooked, the radiator grill 100 is rotatably supported at the common axis of the pair of left and right bosses 90 as the center, the common axis extending in the vehicle width direction of the radiator 70. Thus, the radiator grill 100 can be easily attached to the vehicle body frame 11, temporarily. Moreover, by rotating the radiator grill 100, the radiator grill 100 can be easily adjusted to be at the position where the radiator grill 100 overlaps with the down tubes 27.

In this configuration, when this radiator grill 100 is rotated, as shown in FIG. 9, the pair of left and right bolt fastening units 102 (refer to FIGS. 10(A) and 10(B)) provided at the radiator grill 100 are brought into contact with the stays 97 on the vehicle body frame 11 side via the brim portions 99B of the collars 99, respectively. In this manner, further rotation of the radiator grill 100 is regulated.

Figure 11:
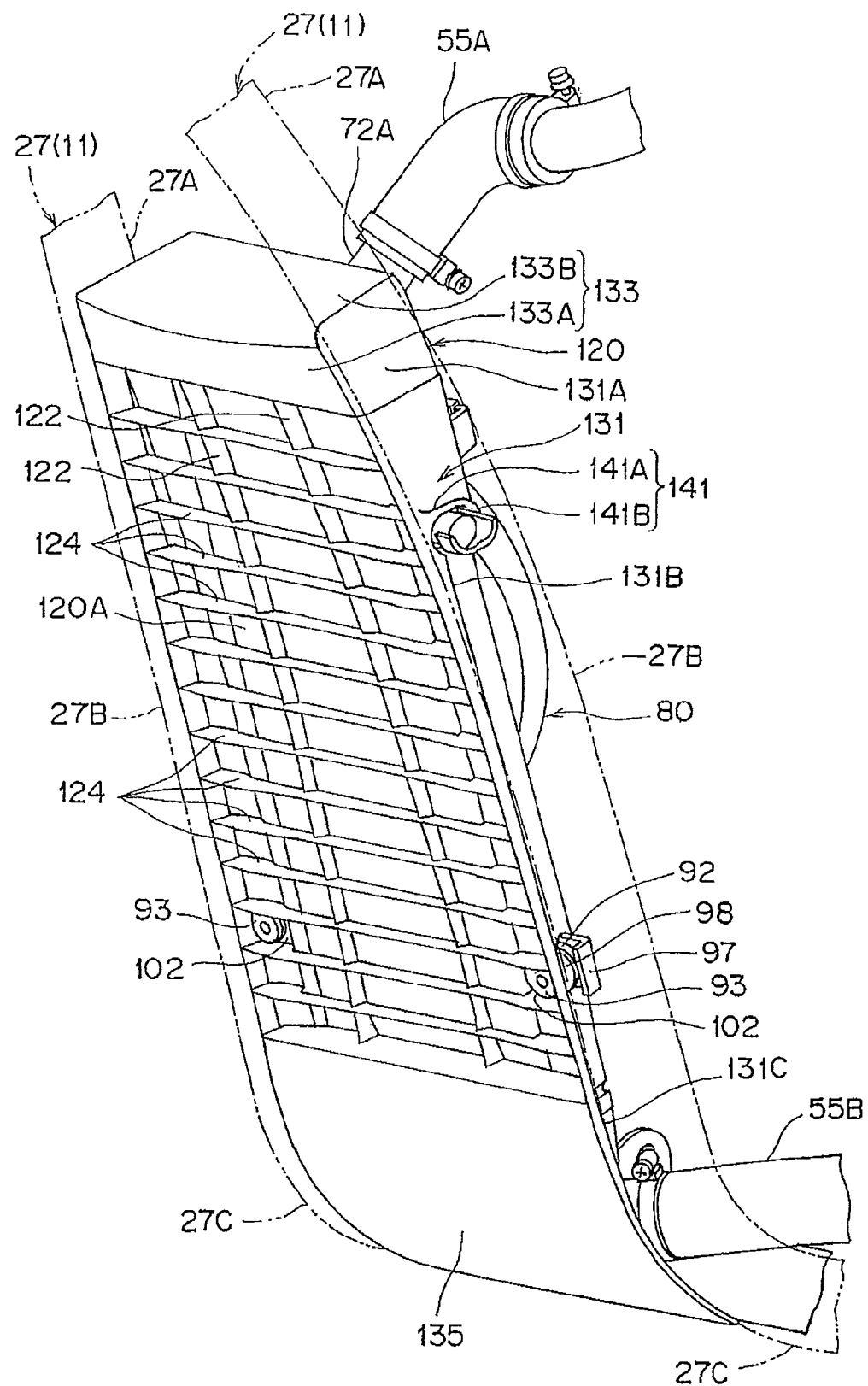
FIG. 11 is a perspective view of a state in which the radiator grill is attached to the vehicle body frame, as viewed from an obliquely forward left side.

FIG. 11 shows a perspective view of the state in which the radiator grill 100 is attached to the vehicle body frame 11, as viewed from an obliquely forward left side. As shown in FIG. 11, at the position where the aforementioned rotation of the radiator grill 100 is regulated, the front surface of the radiator grill 100 is disposed along the front surfaces of the down tubes 27, and the radiator grill 100 is overlapped with the down tubes 27 in the side view. In other words, by rotating the radiator grill 100, the radiator grill 100 can be easily positioned where the radiator grill 100 is overlapped with the down tubes 27, and the radiator grill 100 can be easily fixed at the position by the bolts 93 and the nuts 94.

In a case where the radiator grill 100 is fixed in the aforementioned manner, as shown in FIGS. 11 and 3, the front surface plate 133A and the upper surface plate 133B, which form the upper frame 133 of the radiator grill 100, cover the upper tank 72 attached to the upper portion of the radiator 70 from the front and above. Thus, the upper frame 133 of the radiator grill 100 functions as a protection cover that protects the upper tank 72 and also as a decorative cover that covers the upper tank 72 to make the upper tank 72 invisible from the outside.

Moreover, the lower frame 135 of the radiator grill 100 covers the lower tank 73 attached to the lower portion of the radiator 70 and the pipe 73A from the front and above. The lower frame 135 of the radiator grill 100 functions as a protection cover that covers these components and also as a decorative cover that covers these components to make them invisible from the outside. Thereby, the upper tank 72 and the lower tank 73 can be less visible.

As described above, according to this configuration, the upper portions of the down tubes 27 are formed as the curved portions 27A each curved in the side view, and the lower portions of the down tubes 27 are formed as the linear slope portions 27B each extending linearly downwardly from a corresponding one of the curved portions 27A in the side view. In addition, the radiator 70 is disposed while being overlapped with the linear slope portions 27B of the down tubes 27 in the side view (refer to FIG. 6). Thus, each of the down tubes 27 is formed in a round shape having the curved portion 27A, and the radiator 70 of a linear shape can be disposed in a less visible manner in the side view. Thus, the radiator 70 is not exposed externally in the side view of the vehicle body, and the external appearance of the vehicle improves.

In addition, since each of the down tubes 27 is formed in a shape having the curved portion 27A, each of the linear slope portions 27B of the down tubes 27 is formed at an inclination angle closer to perpendicular than a case where the down tube 27 is formed of only a linear portion. Thus, the radiator 70 along these linear slope portions 27B can be erected by the amount of the inclination angle made closer to perpendicular. When the radiator 70 is erected, the radiator surface faces to the front of the vehicle body, and the projected area of the front surface becomes larger. Thereby, a flow of air further improving the cooling performance can be obtained.

Accordingly, in this configuration, the cooling performance can be obtained without making the radiator 70 larger, and the radiator 70 can be even made smaller.

The flow of air toward the radiator 70 can be roughly categorized into two kinds. One of the two kinds is a flow of air flowing through the upper portion of the front wheel 16 and flowing along the front fender 43 (this flow of air is shown by arrows in FIG. 6). The other one is a flow of air flowing through the left and right sides of the front wheel 16. Since a wide-width tire is employed as the front wheel 16 in this vehicle 10, the amount of air that flows through the left and right sides of the front wheel 16 and that travels toward the radiator 70 is less. As described above, in this vehicle 10, the radiator surface can face to the front of the vehicle body by erecting the radiator 70, so that it is possible to cause the a flow of air flowing along the front fender 43 to efficiently flow through the radiator 70. Thus, a sufficient cooling performance can be obtained.

The radiator grill 100 is provided in front of this radiator 70, and the front surface of the radiator grill 100 is positioned along the front surfaces of the curved portions 27A and the linear slope portions 27B of the respective down tubes 27 (refer to FIGS. 10(B) and 11). Thus, the radiator grill 100 can be disposed to be less visible by positioning the radiator grill 100 along the down tubes 27 each having the curved portion 27A. Moreover, the radiator 70 can be protected and made less visible by this radiator grill 100.

As shown in FIG. 6, the upper rearwardly portion α of the radiator 70 protrudes from the rear surfaces of the down tubes 27 in the side view, and the pair of left and right bosses 90 and the pair of left and right brackets 92 are provided vertically with a space interposed between the pairs to the radiator 70 at the corresponding regions lower than this protruding portion (upper rearwardly portion α). The boss receivers 95 and the stays 97, which support the aforementioned bosses 90 and the brackets 92, respectively, are provided to the respective down tubes 27 at the regions lower than this upper rearwardly portion α of the radiator 70.

More specifically, in this configuration, the radiator 70 is attached to the down tubes 27 at the positions lower than the protruding portion of the radiator 70, which protrudes from the rear surfaces of the down tubes 27, so that the radiator 70 can be attached to the down tubes 27 at the positions where the radiator 70 overlaps with the down tubes 27 in the side view. Thereby, the attachment portions can be made less visible by causing the attachment portions not to be seen externally.

Moreover, the bosses 90 forming the upper side attachment part of the radiator 70 are only placed on the boss receivers 95 of the down tubes 27, respectively (refer to FIG. 8), so that the radiator 70 can be easily attached to the down tubes 27, temporarily. Moreover, in the state where bosses 90 are placed on the boss receivers 95, respectively, the radiator 70 is rotatably supported on the down tubes 27 at the axis line of the bosses 90 as the supporting point, so that the radiator 70 can be easily moved to a position where the radiator 70 overlaps with the down tubes 27 in the side view.

Further, the space between the pair of left and right down tubes 27 becomes wider as the down tubes 27 extend downwardly (refer to FIG. 7), so that the space for disposing the brackets 92 forming the lower attachment portion of the radiator 70 and the stays 97 of the down tubes 27 can be sufficiently secured. Thereby, the operation to fasten these components by use of the bolts 93 and the nuts 94 can be made easier.

The embodiment of the present invention is described above. However, the present invention is not limited to this, and various design modifications can be made. For example, although the rectangular radiator is used in the aforementioned embodiment, a radiator of any shape such as a trapezoidal radiator and a curved radiator can be used. Moreover, in a case where a curved radiator is used, the entire radiator including the upper tank and the lower tank can be overlapped with or can be positioned along the down tubes in the side view.

Moreover, in the aforementioned embodiment, the description is given of the case where the present invention is applied to the radiator attachment structure of the motorcycle shown in FIG. 1. However, the present invention is not limited to this, and may be applied to a radiator attachment structure of another motorcycle or saddle-ride type vehicle including a three-wheel vehicle, four-wheel vehicle or the like classified as an all terrain vehicle (ATV).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiator attachment structure for a saddle-ride type vehicle comprising:
    a vehicle body frame having a pair of left and right down tubes extending from a head pipe respectively on left and right sides; and a radiator between lower portions of the pair of left and right down tubes;
    the radiator having a front, a rear, and two sides, the two sides having an area smaller than that of the front and rear of the radiator;
    an upper portion of each of the left and right down tubes is formed as a curved portion curved in a side view, and a lower portion of each of the down tubes is formed as a linear portion extending linearly downwardly from a corresponding one of the curved portions in the side view; and
    a majority of the two sides of the radiator are overlapped with the right and left down tubes in the side view,
    an upper rear portion of the radiator protrudes from rear surfaces of the down tubes in the side view; and
    wherein the radiator is arranged in a manner such that no portion of the radiator extends forward of the left and right down tubes.

2. The radiator attachment structure for a saddle-ride type vehicle according to claim 1, wherein
    a radiator grill is provided in front of the radiator, and
    a front surface of the radiator grill is positioned along front surfaces of the curved portions and the linear portions of the down tubes.

3. The radiator attachment structure for a saddle-ride type vehicle according to claim 2, wherein
    the radiator is attached to the linear portions of the down tubes at a position lower than the protruding portion.

4. The radiator attachment structure for a saddle-ride type vehicle according to claim 1, wherein
    the radiator is attached to the linear portions of the down tubes at a position lower than the protruding portion.

5. The radiator attachment structure for a saddle-ride type vehicle according to claim 1, wherein each of said down tubes includes a bent portion bent rearwardly from a bottom end of the linear slope portion and a horizontal portion extending linearly rearwardly in a substantially horizontal line from a rear end of the bent portion.

6. The radiator attachment structure for a saddle-ride type vehicle according to claim 5, and further including:
    a first cross frame extending laterally between the linear portions of the down tubes in a position between top and bottom parts of the radiator, and
    a second cross frame extending under an engine of the vehicle between the horizontal portions of the down tubes.

7. The radiator attachment structure for a saddle-ride type vehicle according to claim 1, wherein said radiator includes an upper tank and a lower tank each having a predetermined depth wherein the depth of the upper tank and the lower tank is substantially the same as a diameter of the down tubes.

8. The radiator attachment structure for a saddle-ride type vehicle according to claim 1, and further including left and right bosses projecting laterally from left and right sides of an upper part of the radiator, and a pair of left and right boss receivers projecting laterally toward the radiator from an inner side of each of said left and right down tubes, wherein a corresponding left and right boss mates with a corresponding left and right boss receivers for mounting the radiator relative to the linear portions of the down tubes.

9. The radiator attachment structure for a saddle-ride type vehicle according to claim 8, wherein each of the left and right boss receivers includes a semicircular curved surface for enabling the radiator to rotate about axes of the left and right bosses as a pair of left and right brackets extending laterally from a lower part of the radiator are positioned relative to lower parts of the linear portions of the down tubes.

10. The radiator attachment structure for a saddle-ride type vehicle according to claim 9, wherein the left and right brackets bolt are attachable to the lower parts of the linear portions of the down tubes by means of bolts which extend perpendicularly to the left and right bosses on the upper part of the radiator.

11. A radiator attachment structure for a saddle-ride type vehicle comprising:
a vehicle body frame having a pair of left and right down tubes extending from a head pipe respectively on left and right sides;
a radiator positioned between lower portions of the pair of left and right down tubes;
the radiator having a front, a rear, and two sides, the two sides having an area smaller than that of the front and rear of the radiator;
an upper portion of each of the down tubes is formed as a curved portion curved in a side view; and
a lower portion of each of the left and right down tubes is formed as a linear portion extending linearly downwardly from a corresponding one of the curved portions in the side view, each of said linear portions having a predetermined diameter;
a majority of the two sides of the radiator are overlapped with the left and right down tubes in the side view, wherein the radiator is arranged in a manner such that no portion of the radiator extends forward of the left and right down tubes, wherein the radiator has a predetermined depth and the predetermined diameter of the linear portion of the left and right down tubes is substantially equal to the predetermined depth of the radiator, an upper rear portion of the radiator protrudes from rear surfaces of the down tubes in the side view,
and further including left and right bosses projecting laterally from left and right sides of an upper part of the radiator, and a pair of left and right boss receivers projecting laterally toward the radiator from an inner side of each of said left and right down tubes,
wherein a corresponding left and right boss mates with a corresponding left and right boss receivers for mounting the radiator relative to the linear portions of the down tubes.

12. The radiator attachment structure for a saddle-ride type vehicle according to claim 11, wherein a radiator grill is provided in front of the radiator, and
a front surface of the radiator grill is positioned along front surfaces of the curved portions and the linear portions of the down tubes.

13. The radiator attachment structure for a saddle-ride type vehicle according to claim 11, wherein
the radiator is attached to the linear portions of the down tubes at a position lower than the protruding portion.

14. The radiator attachment structure for a saddle-ride type vehicle according to claim 12, wherein
the radiator is attached to the linear portions of the down tubes at a position lower than the protruding portion.

15. The radiator attachment structure for a saddle-ride type vehicle according to claim 11, wherein each of said down tubes includes a bent portion bent rearwardly from a bottom end of the linear slope portion and a horizontal portion extending linearly rearwardly in a substantially horizontal line from a rear end of the bent portion.

16. The radiator attachment structure for a saddle-ride type vehicle according to claim 11, and further including a cross frame extending between the linear portions of the down tubes in a position between top and bottom parts of the radiator.

17. The radiator attachment structure for a saddle-ride type vehicle according to claim 11, wherein said radiator includes an upper tank and a lower tank each having a predetermined depth wherein the depth of the upper tank and the lower tank is substantially the same as the diameter of the down tubes.

18. The radiator attachment structure for a saddle-ride type vehicle according to claim 16, and further including a another cross frame extending under an engine of the vehicle between horizontal portions of the linear portion down tubes.

19. The radiator attachment structure for a saddle-ride type vehicle according to claim 11, wherein each of left and right boss receivers includes a semicircular curved surface for enabling the radiator to rotate about axes of the left and right bosses as a pair of left and right brackets extending laterally from a lower part of the radiator are positioned relative to lower parts of the linear portions of the down tubes.

20. The radiator attachment structure for a saddle-ride type vehicle according to claim 19, wherein left and right brackets are attachable to the lower parts of the linear portions of the down tubes by means of bolts which extend perpendicularly to the left and right bosses on the upper part of the radiator.

* * * * *